United States Patent
Gross et al.

(10) Patent No.: US 10,664,324 B2
(45) Date of Patent: May 26, 2020

(54) INTELLIGENT WORKLOAD MIGRATION TO OPTIMIZE POWER SUPPLY EFFICIENCIES IN COMPUTER DATA CENTERS

(71) Applicant: Oracle International Corporation, Redwood Shores, CA (US)

(72) Inventors: Kenny C. Gross, Escondido, CA (US); Sanjeev Sondur, Horsham, PA (US)

(73) Assignee: Oracle International Corporation, Redwood Shores, CA (US)

( * ) Notice: Subject to any disclaimer, the term of this patent is extended or adjusted under 35 U.S.C. 154(b) by 168 days.

(21) Appl. No.: 15/993,446

(22) Filed: May 30, 2018

(65) Prior Publication Data

US 2019/0370085 A1 Dec. 5, 2019

(51) Int. Cl.
*G06F 9/50* (2006.01)
*H04L 12/803* (2013.01)
*G06F 1/3296* (2019.01)
*G06F 9/48* (2006.01)

(52) U.S. Cl.
CPC .......... *G06F 9/5088* (2013.01); *G06F 1/3296* (2013.01); *G06F 9/4818* (2013.01); *H04L 47/125* (2013.01)

(58) Field of Classification Search
CPC .... G06F 1/3203; G06F 1/3296; G06F 9/5027; G06F 9/505; G06F 9/5088; G06F 11/3447; G06F 2209/5019; G06F 2209/5021
See application file for complete search history.

(56) References Cited

U.S. PATENT DOCUMENTS

| | | | |
|---|---|---|---|
| 7,020,802 B2 | 3/2006 | Gross et al. | |
| 7,934,123 B2 | 4/2011 | Gross et al. | |
| 8,429,431 B2 | 4/2013 | Malik et al. | |
| 8,631,411 B1 | 1/2014 | Ghose | |
| 9,557,792 B1 * | 1/2017 | Potlapally | H05K 7/1492 |
| 9,607,343 B2 | 3/2017 | Chen et al. | |

(Continued)

OTHER PUBLICATIONS

Beloglazov; "Energy-Efficient Management of Virtual Machines in Data Centers for Cloud Computing", downloaded at http://www.buyya.com/gridbus/students/AntonPhDThesis2013.pdf on Mar. 20, 2018.

(Continued)

*Primary Examiner* — Dong U Kim
(74) *Attorney, Agent, or Firm* — Park, Vaughan, Fleming & Dowler LLP (57) ABSTRACT

The disclosed embodiments provide a system that intelligently migrates workload between servers in a data center to improve efficiency in associated power supplies. During operation, the system receives time-series signals associated with the servers during operation of the data center, wherein the servers include low-priority servers and high-priority servers. Next, the system analyzes the time-series signals to predict a load utilization for the servers. The system then migrates workload between the servers in the data center based on the predicted load utilization so that: the high-priority servers have sufficient workload to ensure that associated power supplies for the high-priority servers operate in a peak-efficiency range; and the low-priority servers operate with less workload or no workload.

18 Claims, 4 Drawing Sheets

(56) References Cited

U.S. PATENT DOCUMENTS

| | | | |
|---|---|---|---|
| 2008/0301479 A1* | 12/2008 | Wood | G06F 1/3203 713/322 |
| 2008/0320322 A1* | 12/2008 | Green | G06F 1/26 713/340 |
| 2009/0118019 A1* | 5/2009 | Perlman | A63F 13/12 463/42 |
| 2009/0276639 A1* | 11/2009 | Saha | H02M 3/156 713/300 |
| 2011/0145830 A1* | 6/2011 | Yamaguchi | G06F 9/5027 718/104 |
| 2011/0239010 A1* | 9/2011 | Jain | G06F 1/3209 713/310 |
| 2011/0245988 A1* | 10/2011 | Ingels | G06F 1/26 700/295 |
| 2012/0265881 A1* | 10/2012 | Chen | H04L 12/12 709/226 |
| 2012/0331477 A1* | 12/2012 | Zeighami | G06F 9/5088 718/104 |
| 2014/0156100 A1 | 6/2014 | El-Essawy et al. | |
| 2015/0046600 A1* | 2/2015 | Kim | H04L 67/1095 709/232 |
| 2015/0120874 A1* | 4/2015 | Kim | H04L 67/1097 709/218 |
| 2015/0195213 A1* | 7/2015 | Orita | G06F 9/5055 709/226 |
| 2015/0304176 A1* | 10/2015 | Ting | H04L 67/1031 709/203 |
| 2017/0070567 A1* | 3/2017 | Lee | H04L 67/1008 |
| 2017/0255239 A1 | 9/2017 | Matteson et al. | |
| 2019/0004579 A1* | 1/2019 | Allen-Ware | G06F 1/3206 |
| 2019/0087228 A1* | 3/2019 | Ross | G06F 11/3086 |
| 2019/0220319 A1* | 7/2019 | Parees | G06F 9/505 |
| 2019/0317813 A1* | 10/2019 | Larsson | G06F 17/142 |

OTHER PUBLICATIONS

Dumitru et al; "Dynamic Management Techniques for Increasing Energy Efficiency within a Data Center", UNITE Doctoral Symposium; downloaded from https://arxiv.org/ftp/arxiv/papers/1305/1305.6203.pdf on Mar. 20, 2018.

Hu et al.; "Efficient Resources Provisioning Based on Load Forcasting in Cloud", Published online Feb. 20, 2014, downloaded from https://www.ncbi.nlm.nih.gov/pmc/articles/PMC3951090/ on Jan. 5, 2018.

Uchechukwu et al.; "Energy Consumption in Cloud Computing Data Centers", published Jun. 2014, International Journal of Cloud Computing and Services Science (IJ-CLOSER), vol. 3, No. 3, pp. 145-162 downloaded at http://www.iaesjournal.com/online/index.php/IJ-CLOSER/article/view/6346/3433 on Mar. 20, 2018.

\* cited by examiner

INTELLIGENT WORKLOAD MIGRATION TO OPTIMIZE POWER SUPPLY EFFICIENCIES IN COMPUTER DATA CENTERS

BACKGROUND

Field

The disclosed embodiments generally relate to techniques for saving power in computer data centers. More specifically, the disclosed embodiments relate to a new technique for performing intelligent workload migration in a computer data center to optimize associated power supply efficiencies, and to thereby reduce wasted power.

Related Art

All of the power, which is consumed by computing hardware in a computer data center, passes through associated power supply units (PSUs), which actually consume a significant fraction of a data center's energy budget. PSUs are very efficient when operating in a "peak-efficiency range" at higher power levels. However, this efficiency falls off dramatically when the output demand for the PSU is low. For example, empirical measurements indicate that PSUs are about 90% efficient when the PSU loads are high, but are only 65% to 75% efficient when PSU loads drop below 20%. This is a significant problem because data centers are typically overprovisioned with computing hardware to meet periodic spikes in computational demand. This means that during normal operation most servers in a computer data center operate at low utilization levels, typically less than 20%. As a consequence, the associated PSUs also operate at low utilization levels and hence low power efficiencies, which wastes a considerable amount of power.

Therefore, what is needed is a technique for improving the power efficiency of PSUs in computer data centers.

SUMMARY

The disclosed embodiments provide a system that intelligently migrates workload between servers in a data center to improve efficiency in associated power supplies. During operation, the system receives time-series signals associated with the servers during operation of the data center, wherein the servers include low-priority servers and high-priority servers. Next, the system analyzes the time-series signals to predict a load utilization for the servers. The system then migrates workload between the servers in the data center based on the predicted load utilization so that: the high-priority servers have sufficient workload to ensure that associated power supplies for the high-priority servers operate in a peak-efficiency range; and the low-priority servers operate with less workload or no workload.

In some embodiments, the system powers down one or more of the low-priority servers that have no workload to save power.

In some embodiments, the system transitions one or more of the low-priority servers that have no workload into a low-power sleep mode.

In some embodiments, while migrating the workload between the servers, the system selectively migrates low-priority jobs from the low-priority servers to the high-priority servers to fill in workload troughs for the high-priority servers, so that the power supplies associated with the high-priority servers continually operate in the peak-efficiency range.

In some embodiments, the migrated low-priority jobs execute with a lower priority than existing high-priority jobs on the high-priority servers, whereby the low-priority jobs do not interfere with execution of the high-priority jobs.

In some embodiments, analyzing the time-series signals involves: performing a fast Fourier transformation (FFT) on the time-series signals to produce a frequency-domain representation of the time-series signals; computing a power spectral density (PSD) function based on the frequency domain representation of the time-series signals; sorting PSD estimates obtained from the PSD function based on amplitude; selecting M highest harmonics from the sorted PSD estimates; reconstructing a synthesized signal by performing an inverse FFT operation on the selected M highest harmonics; and using the synthesized signal to predict the load utilization for the servers.

In some embodiments, analyzing the time-series signals involves creating a time-series "idle" variable, which represents an idle time for the servers, and is a complement of a load utilization variable. In these embodiments, predicting the load utilization for the servers involves using the idle variable to project future idle times for the servers to facilitate the migration of the workload between the servers.

In some embodiments, the time-series signals include: time-series values for physical performance measured through physical sensors in the servers and the associated power supplies; and time-series values for internal performance parameters maintained by software associated with the servers.

In some embodiments, analyzing the time-series signals involves analyzing a trailing window of the time-series signals.

DETAILED DESCRIPTION

The following description is presented to enable any person skilled in the art to make and use the present embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present embodiments. Thus, the present embodiments are not limited to the embodiments shown, but are to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Overview

The disclosed embodiments provide a system that "learns" load dynamics across data center assets using a Fourier-decomposition technique described below, and then uses the learned load dynamics to predict idle time across the monitored data center assets. The predicted idle time profile is then used to facilitate intelligent scheduling of low-priority workloads onto high-priority business servers running high-priority workloads. These low-priority workloads are executed using cycles that would otherwise be idle during lulls in the high-priority workloads. This intelligent scheduling makes it possible for all of the PSUs in the data center to be either turned off when they are not needed, or otherwise turned on and operating very close to the peak of their power-efficiency curves when they are needed.

In addition to improving the power-efficiency of data center assets, the system provides additional benefits, such as: (1) improving reliability across the data center assets; (2) achieving higher efficiency while cooling the data center; and (3) reducing the impact of upcoming carbon taxes. The improvement in reliability arises from the fact that smoothing out the large peaks and troughs in workload dynamics results in smaller thermal variations across the data center. Thermal cycling is known to accelerate a number of physical mechanisms that cause electronic systems to prematurely degrade. Conversely, higher thermal stability facilitates better long-term reliability.

The improvement in cooling efficiency arises from the fact that data center heating ventilation and cooling (HVAC) and computer room air conditioning (CRAC) systems also have thermodynamic efficiency curves. If a data center cooling system is set at a fixed (or slowly changing) output level, then it is significantly over-cooling during the "troughs" in workload, and is consequently wasting energy. Alternatively, if the data center cooling system is set up to adjust dynamically to the workload levels of the servers, then the HVAC systems are continually swinging through regions of higher and lower efficiency. The disclosed system keeps the power consumption (and hence the heat dissipation) for data center assets more constant over time. This saves significant energy in the associated PSUs, and also saves additional energy by allowing the HVAC and/or CRAC cooling systems to be base-loaded in a peak energy-efficiency range.

Virtualization systems, which facilitate workload mobility, such as Oracle Live Migration™, have been touted over the past decade as energy-saving innovations for the data center. These systems have the potential to save energy in situations where on-premises data centers or cloud data centers have low average utilizations across their IT assets. In these situations, virtualization systems can be used to migrate the workload to a subset of the IT assets, which makes it possible to turn off other machines that are sitting idle, which can save a considerable amount of energy.

However, this approach to saving energy in data centers often does not operate effectively in practice. For example, cloud data centers also keep their average utilizations low (typically under 20%) to provide "elasticity" to allow for peaks in demand. However, cloud data center operators have so far not been using virtualization systems to migrate workloads to turn off machines because it takes at least 45 minutes to power up a server, warm up its caches, and get the server back into a state to accept new workloads. Forty-five minutes is too long to wait when server assets are needed.

Note that PSUs in typical data center servers consume a significant amount of the server's total energy budget, but with the following characteristic: PSUs in an idle machine are wasting very little energy because the CPUs and memory are drawing minimal current. In contrast, PSUs in highly utilized servers are also wasting very little energy because the energy efficiency of the PSUs is >95% when utilizations are high. However, PSU servers that are operating at between 5% and 30% utilization are wasting a substantial amount of energy.

Figure 1:
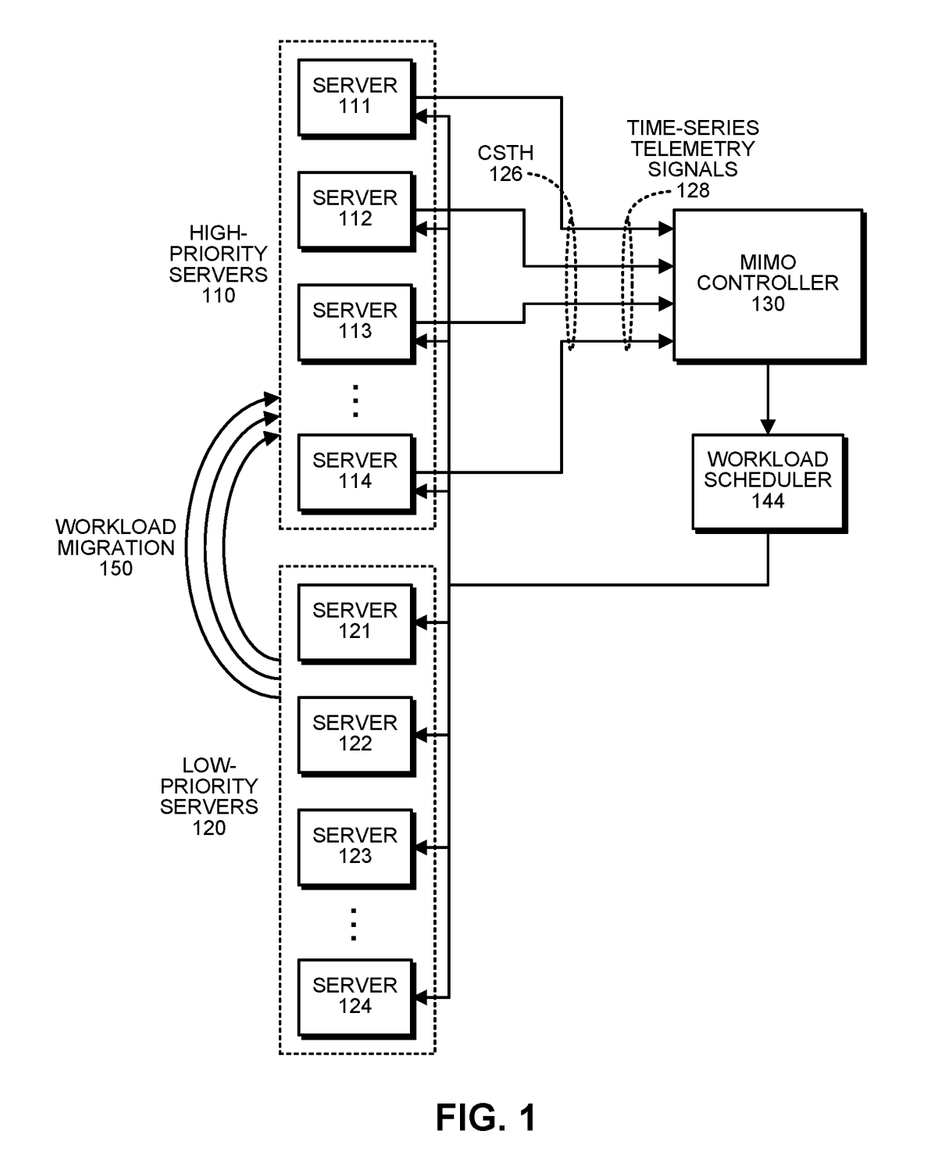
FIG. 1 illustrates an exemplary workload-migration system in accordance with the disclosed embodiments.

Referring to FIG. 1, the disclosed embodiments provide a workload-migration system for a data center, which is structured as follows. The system includes a set of high-priority servers 110, which includes servers 111-114, and a set of low-priority servers 120, which includes servers 121-124. Time-series telemetry signals 128 are obtained from the high-priority servers 110 through a Continuous System Telemetry Harness (CSTH) 126, which monitors a large number of internal server telemetry metrics, including distributed voltages, currents, PSU internal temperatures and real-time workload-demand, fan speeds, and power metrics. (For example, see U.S. Pat. No. 7,020,802, entitled "Method and Apparatus for Monitoring and Recording Computer System Performance Parameters," by inventors Kenny C. Gross, et al., filed on 17 Oct. 2002, which is hereby incorporated herein by reference.)

The time-series telemetry signals 128 gathered by CSTH 126 feed into a Multiple-Input, Multiple-Output (MIMO) controller 130, which analyzes the time-series telemetry signals 128 to generate predictions for future workloads. These predictions feed into a workload scheduler 144, which utilizes a workload mobility application, such as Oracle Live Migration™, to perform workload migration 150 between high-priority servers 110 and low-priority servers 120. The process of analyzing the time-series telemetry signals 128 and migrating the workload is described in more detail below.

During operation, the system analyses a "trailing window" of dynamic telemetry patterns using advanced pattern-recognition techniques to forecast PSU loads and efficiencies across thousands of PSUs in a typical data center. The system then uses the workload-mobility features of a virtualization system, such as Oracle Live Migration™ to migrate workload in a manner that does not require assets to be powered off to save energy, and does not require any interaction with system administrators. This enables power supplies across the data center to be automatically operated in a peak-efficiency range, thereby reducing the amount of power required to operate the computational resources, and also significantly reducing cooling costs. Additional benefits include improved reliability because the system smoothes out high and low swings in operating temperatures, and improved cooling efficiency because HVAC systems also have cooling-efficiency curves, and they can operate in their efficiency "sweet spot."

While analyzing the time-series data, the system applies a Fourier decomposition to a trailing window (e.g., the most recent three weeks) containing a time-series metric, which reflects the load level for the server assets, or another telemetry metric, which reflects the load dynamics for the server assets. (Note that the dynamic power as a function of time can be used as a proxy for the load of a server.) In the following description, we discuss the dynamic load for an individual server in the data center. However, the described technique works equally well if it is applied with coarser granularity to racks or clusters of servers. In all of these cases, the metrics reflecting dynamic load or dynamic power are measured directly from CSTH software.

Figure 2:
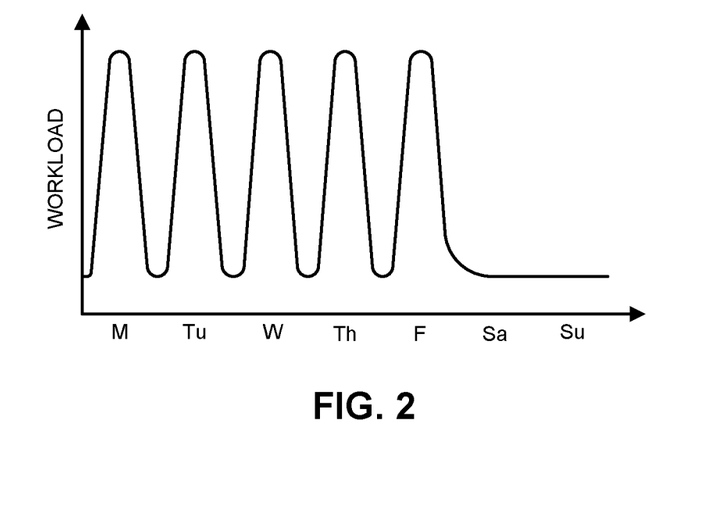
FIG. 2 presents a graph illustrating diurnal load variations in a computer data center in accordance with the disclosed embodiments.

Most servers in enterprise data centers exhibit significant fluctuations in their load levels, and hence power levels. The load levels tend to be low in the middle of the night, but high during the business day. The loads may also be low on weekends. Hence, the load dynamics exhibit peaks and troughs during the five business days of the week, as illustrated in the graph that appears in FIG. 2. (For some enterprise data centers, which reflect worldwide business dynamics, there are actually three minor "humps" in the 24-hour cycles associated with business activity across three major geographic regions, including the United States, Asia and Europe.) Note that there exist diurnal cyclic patterns in the load profiles during the five business days of the week, and these cyclic patterns can be easily decomposed using a simple Fourier decomposition technique. We found that we can capture most dynamics in the signals quite well using only a few terms in the Fourier series. In practice, we have found that using five Fourier modes works well.

Figure 3:
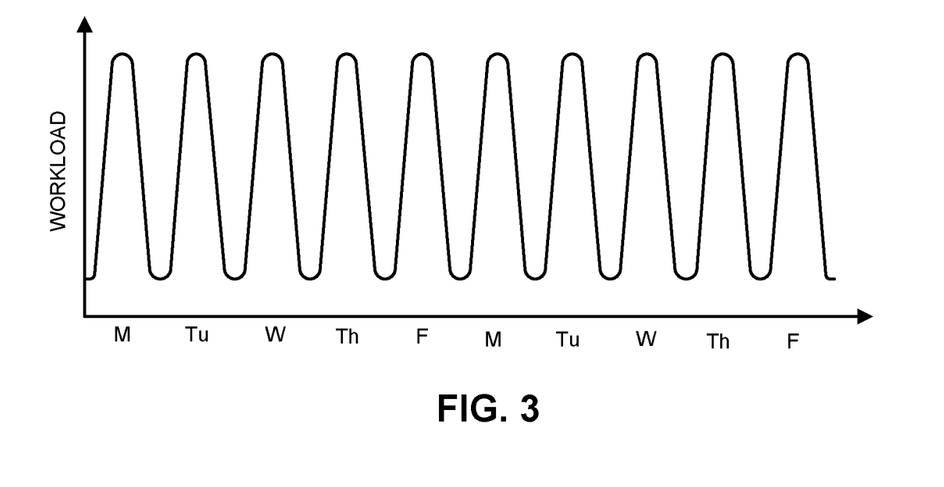
FIG. 3 presents a graph illustrating diurnal load variations (with weekends removed) in a computer data center in accordance with the disclosed embodiments.

The first step in preprocessing the telemetry data is to remove weekends. This is desirable for data center assets that exhibit low loads (reflecting low business activity) on weekends. If there are data centers that show dynamic cycles in loads for all seven days per week, then the Fourier decomposition can be applied to continuous "moving history" windows, which carry the last 21 days of telemetry metrics. Alternatively, for data centers that show low loads on weekends, we first cut out the weekend loads and concatenate the load cycles for the business days. For example, see the graph which appears in FIG. 3.

The Fourier decomposition technique now proceeds as follows.

(1) The system first samples raw quantized observations for the load (or power) variable creating a time-series $Y_t$.

(2) The system then processes the quantized time-series data using a Fourier decomposition. The approach is to first perform a frequency domain transformation of the quantized $Y_t$ using a simple Fourier series expansion:

$$Y_t = \frac{a_0}{2} + \sum_{m=1}^{N/2} (a_m \cos(\omega_m t) + b_m \sin(\omega_m t))$$

where: $a_0/2$ is the mean value of the quantized signal; $a_m$ and $b_m$ are the Fourier coefficients corresponding to the Fourier frequency $\omega_m$; and N is the total number of observations. Using the Fourier coefficients, we now generate a composite function $X_t$ using the values of the largest harmonics identified in the Fourier transformation of the quantized signal $Y_t$. The following numerical approximation to the Fourier transform is useful in determining the Fourier coefficients $a_m$ and $b_m$. Let $x_j$ be the value of $X_t$ at the $j^{th}$ time increment. Then, assuming $2\pi$ periodicity and letting=$2\pi m/N$, the approximation to the Fourier transform yields:

$$a_m = \frac{2}{N} \sum_{j=0}^{N-1} x_j \cos(\omega_m j)$$

$$b_m = \frac{2}{N} \sum_{j=0}^{N-1} x_j \sin(\omega_m j)$$

for $0<m<N/2$. Finally, the power spectral density (PSD) function for the signal is given by:

$$l_m = N \frac{a_m^2 + b_m^2}{2}.$$

When there are N observations in the raw signal, the resulting PSD function contains (N/2)+1 harmonics (spectral amplitudes) in the frequency domain.

(3) The system then sorts the PSD estimates in order of decreasing amplitude.

(4) Next, the system selects the M highest harmonics. Note that a default value of M=5 works well for most telemetry signals, but can be optimized for specific signals using the procedure outlined below if even higher accuracy is desired.

(5) Finally, the system reconstructs a synthesized signal by performing an inverse Fast Fourier Transform (FFT) using only the M harmonics. The system then uses this inverse FFT as an approximation to the business dynamics for the server (or cluster, rack, etc.) being monitored.

At this point, the load metric is normalized on a percent basis. Peak loads may be as high as 100%, but for most business-related data centers the peaks are much lower, for example <20%. We now create a time-series variable called "IDLE," where IDLE is the complement of the load-utilization variable, which represents the idle time on the server or servers being monitored. The IDLE variable is used to project idle time into the future.

This digitized time-series function is then used to schedule low-priority workloads onto high-priority servers. (For example, these low-priority workloads can include Enterprise Resource Planning (ERP), Customer Relationship Management (CRM), or business analytics processing; simulation jobs, and batch Computer-Aided Design (CAD) jobs. Note that these low-priority workloads typically comprise jobs that would otherwise have been running on inexpensive low-priority servers.) The low-priority servers may now be shut off, or put into a low-power "sleep state."

The low-priority workload, which runs using idle cycles on the high-priority servers, not only saves the energy that would have been used by the low-priority servers, but also enables the high-priority servers to operate at a higher energy efficiency because their power supplies are now operating continuously in a peak-efficiency range.

An additional benefit is that the workload on the high-priority servers now becomes stationary throughout the week, instead of cycling with the business dynamics. This enables higher aggregate energy-efficiency levels in the data center HVAC systems, and also promotes improved long-term reliability through more stable system temperatures.

Note that the low-priority workload, which is used to soak up the "idle cycles" on the high-priority servers, is actually run with a very low priority. (For Unix/Linux/Solaris-based systems, this is done using the "nice" function.) As such, the low-priority workload will not interfere with (or slow down) the high-priority workload. For example, if the Fourier-decomposition technique were to under-predict load during a time period (i.e., over-predict idle time because of a large company-wide promotional sale that recently expired), the high-priority workload will simply fill the available cycles, with no impact from the lower-priority backfill, which is running at the lowest possible background priority. Also, because the low-priority workload is run at a very low priority, the low-priority workload can be easily categorized and separated in the moving telemetry history window for ongoing surveillance of the high-priority business workload dynamics. Otherwise, the total workload would maintain a high and nearly constant value and mask the dynamics of the high-priority business workload.

Process of Caching Time-Series Data

Figure 4:
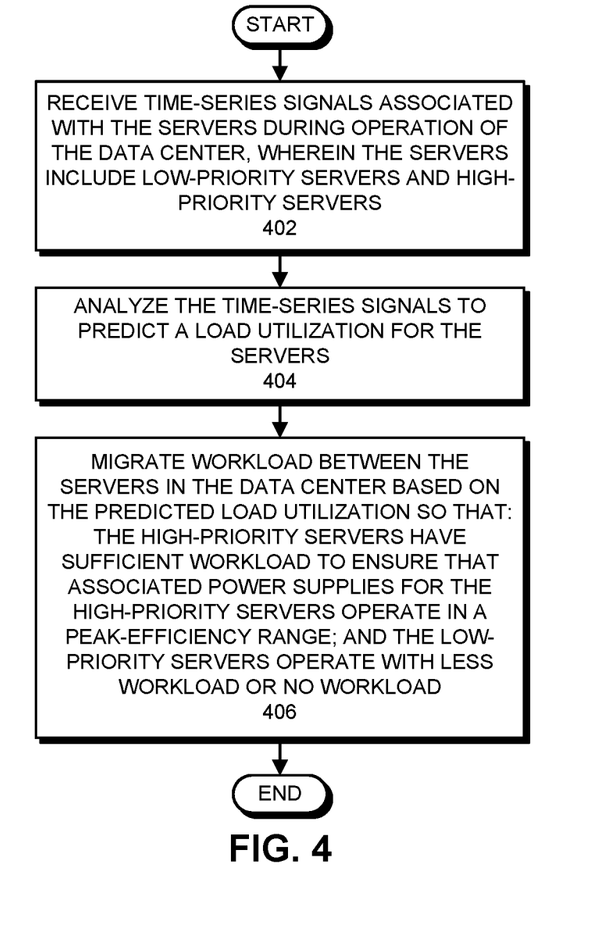
FIG. 4 presents a flow chart illustrating the process of migrating workload between servers in a data center to improve efficiency in associated power supplies in accordance with the disclosed embodiments.

FIG. 4 presents a flow chart illustrating the process of migrating workload between servers in a data center to improve efficiency in associated power supplies in accordance with the disclosed embodiments. During operation, the system receives time-series signals associated with the servers during operation of the data center, wherein the servers include low-priority servers and high-priority servers (step 402). Next, the system analyzes the time-series signals to predict a load utilization for the servers (step 404). The system then migrates workload between the servers in the data center based on the predicted load utilization so that: the high-priority servers have sufficient workload to ensure that associated power supplies for the high-priority servers operate in a peak-efficiency range; and the low-priority servers operate with less workload or no workload (step 406).

Figure 5:
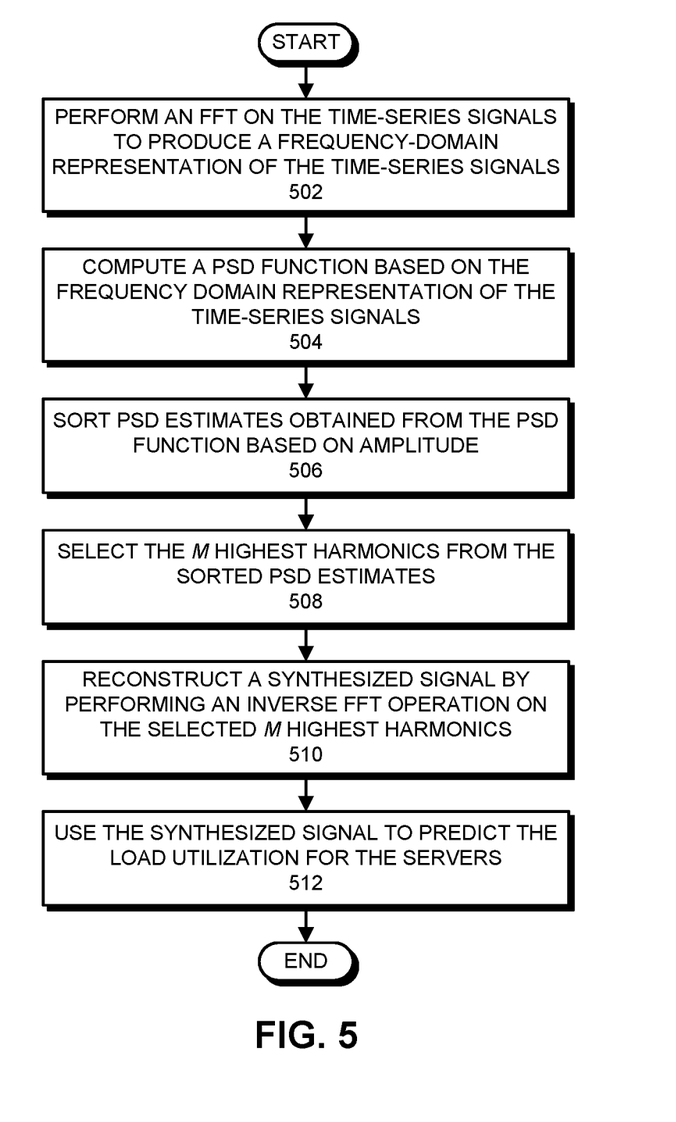
FIG. 5 presents a flow chart illustrating the process of analyzing the time-series signals in accordance with the disclosed embodiments.

FIG. 5 presents a flow chart illustrating the process of analyzing the time-series signals in accordance with the disclosed embodiments. While analyzing the time-series signals, the system first performs an FFT on the time-series signals to produce a frequency-domain representation of the time-series signals (502). The system then computes a PSD function based on the frequency domain representation of the time-series signals (step 504). Next, the system sorts PSD estimates obtained from the PSD function based on amplitude (step 506), and selects the M highest harmonics from the sorted PSD estimates (step 508). The system then reconstructs a synthesized signal by performing an inverse FFT operation on the selected M highest harmonics (step 510), and uses the synthesized signal to predict the load utilization for the servers (step 512).

Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A method for migrating workload between servers in a data center to improve efficiency in associated power supplies, comprising:
receiving time-series signals associated with the servers during operation of the data center, wherein the servers include low-priority servers and high-priority servers;
analyzing the time-series signals to predict a load utilization for the servers and to create a load utilization variable and a time-series "idle" variable, which represents an idle time for the servers, and is a complement of the load utilization variable;
migrating workload between the servers in the data center based on the predicted load utilization so that,
the high-priority servers have a workload that ensures that associated power supplies for the high-priority servers operate within a pre-determined threshold of a peak of the associated power supplies' power-efficiency curves, and
the low-priority servers operate with less workload or no workload; and
wherein predicting the load utilization for the servers involves using the idle variable to project future idle times for the servers to facilitate the migration of the workload between the servers.

2. The method of claim 1, further comprising powering down one or more of the low-priority servers that have no workload to save power.

3. The method of claim 1, further comprising transitioning one or more of the low-priority servers that have no workload into a low-power sleep mode.

4. The method of claim 1, wherein migrating the workload between the servers involves selectively migrating low-priority jobs from the low-priority servers to the high-priority servers to fill in workload troughs for the high-priority servers, so that the power supplies associated with the high-priority servers continually operate in the peak-efficiency range.

5. The method of claim 4, wherein the migrated low-priority jobs execute with a lower priority than existing high-priority jobs on the high-priority servers, whereby the low-priority jobs do not interfere with execution of the high-priority jobs.

6. The method of claim 1, wherein analyzing the time-series signals comprises:
performing a fast Fourier transformation (FFT) on the time-series signals to produce a frequency-domain representation of the time-series signals;
computing a power spectral density (PSD) function based on the frequency domain representation of the time-series signals;
sorting PSD estimates obtained from the PSD function based on amplitude;

selecting an M highest harmonics from the sorted PSD estimates where M is a pre-determined value greater than 1;

reconstructing a synthesized signal by performing an inverse FFT operation on the selected M highest harmonics; and using the synthesized signal to predict the load utilization for the servers.

7. The method of claim 1, wherein the time-series signals include:

time-series values for physical performance measured through physical sensors in the servers and the associated power supplies; and time-series values for internal performance parameters maintained by software associated with the servers.

8. The method of claim 1, wherein analyzing the time-series signals involves analyzing a trailing window of the time-series signals.

9. A non-transitory, computer-readable storage medium storing instructions that when executed by a computer cause the computer to perform a method for migrating workload between servers in a data center to improve efficiency in associated power supplies, the method comprising:

receiving time-series signals associated with the servers during operation of the data center, wherein the servers include low-priority servers and high-priority servers;

analyzing the time-series signals to predict a load utilization for the servers and to create a load utilization variable and a time-series "idle" variable, which represents an idle time for the servers, and is a complement of the load utilization variable;

migrating workload between the servers in the data center based on the predicted load utilization so that, the high-priority servers have a workload that ensures that associated power supplies for the high-priority servers operate within a pre-determined threshold of a peak of the associated power supplies' power-efficiency curves, and the low-priority servers operate with less workload or no workload; and wherein predicting the load utilization for the servers involves using the idle variable to project future idle times for the servers to facilitate the migration of the workload between the servers.

10. The non-transitory, computer-readable storage medium of claim 9, wherein the method further comprises powering down one or more of the low-priority servers that have no workload to save power.

11. The non-transitory, computer-readable storage medium of claim 9, wherein the method further comprises transitioning one or more of the low-priority servers that have no workload into a low-power sleep mode.

12. The non-transitory, computer-readable storage medium of claim 9, wherein migrating the workload between the servers involves selectively migrating low-priority jobs from the low-priority servers to the high-priority servers to fill in workload troughs for the high-priority servers, so that the power supplies associated with the high-priority servers continually operate in the peak-efficiency range.

13. The non-transitory, computer-readable storage medium of claim 12, wherein the migrated low-priority jobs execute with a lower priority than existing high-priority jobs on the high-priority servers, whereby the low-priority jobs do not interfere with execution of the high-priority jobs.

14. The non-transitory, computer-readable storage medium of claim 9, wherein analyzing the time-series signals comprises:

performing a fast Fourier transformation (FFT) on the time-series signals to produce a frequency-domain representation of the time-series signals;

computing a power spectral density (PSD) function based on the frequency domain representation of the time-series signals;

sorting PSD estimates obtained from the PSD function based on amplitude;

selecting an M highest harmonics from the sorted PSD estimates where M is a pre-determined value greater than 1;

reconstructing a synthesized signal by performing an inverse FFT operation on the selected M highest harmonics; and using the synthesized signal to predict the load utilization for the servers.

15. A system that migrates workload between servers in a data center to improve efficiency in associated power supplies, comprising:

at least one processor and at least one associated memory; and a migration mechanism that executes on the at least one processor, wherein during operation, the migration mechanism:

receives time-series signals associated with the servers during operation of the data center, wherein the servers include low-priority servers and high-priority servers;

analyzes the time-series signals to predict a load utilization for the servers and to create a load utilization variable and a time-series "idle" variable, which represents an idle time for the servers, and is a complement of the load utilization variable;

migrates workload between the servers in the data center based on the predicted load utilization so that, the high-priority servers have a workload that ensures that associated power supplies for the high-priority servers operate within a pre-determined threshold of a peak of the associated power supplies' power-efficiency curves, and the low-priority servers operate with less workload or no workload; and wherein predicting the load utilization for the servers involves using the idle variable to project future idle times for the servers to facilitate the migration of the workload between the servers.

16. The system of claim 15, wherein the migration mechanism powers down one or more of the low-priority servers that have no workload to save power.

17. The system of claim 15, wherein the migration mechanism transitions one or more of the low-priority servers that have no workload into a low-power sleep mode.

18. The system of claim 15, wherein while migrating the workload between the servers, the migration mechanism selectively migrates low-priority jobs from the low-priority servers to the high-priority servers to fill in workload troughs for the high-priority servers, so that the power supplies associated with the high-priority servers continually operate in the peak-efficiency range.

* * * * *